US011239730B2

(12) United States Patent
Hirabayashi et al.

(10) Patent No.: US 11,239,730 B2
(45) Date of Patent: Feb. 1, 2022

(54) ROTATING DEVICE

(71) Applicant: MINEBEA MITSUMI Inc., Nagano (JP)

(72) Inventors: Koichiro Hirabayashi, Nagano (JP); Yukimasa Matsumura, Nagano (JP)

(73) Assignee: MINEBEA MITSUMI INC., Nagano (JP)

( * ) Notice: Subject to any disclaimer, the term of this patent is extended or adjusted under 35 U.S.C. 154(b) by 96 days.

(21) Appl. No.: 16/756,901

(22) PCT Filed: Aug. 23, 2018

(86) PCT No.: PCT/JP2018/031079
§ 371 (c)(1),
(2) Date: Apr. 17, 2020

(87) PCT Pub. No.: WO2019/082490
PCT Pub. Date: May 2, 2019

(65) Prior Publication Data
US 2021/0203208 A1    Jul. 1, 2021

(30) Foreign Application Priority Data

Oct. 24, 2017  (JP) .............................. JP2017-205086

(51) Int. Cl.
*H02K 7/08*     (2006.01)
*F16H 1/16*     (2006.01)
(Continued)

(52) U.S. Cl.
CPC .............. *H02K 7/081* (2013.01); *F16H 1/16* (2013.01); *H02K 5/1732* (2013.01); *H02K 5/24* (2013.01);
(Continued)

(58) Field of Classification Search
CPC ............ H02K 7/08; H02K 5/173; H02K 5/24; H02K 7/116; H02K 7/1166; H02K 7/081;
(Continued)

(56) References Cited

U.S. PATENT DOCUMENTS 4,420,703 A * 12/1983 Adam .................... E05F 15/697
310/154.36
5,325,736 A *  7/1994 Tsujita ..................... F16C 17/26
310/90

(Continued)

FOREIGN PATENT DOCUMENTS

DE    10 2006 021986 A1    11/2007
DE    10 2014 100675 A1     7/2014
(Continued)

OTHER PUBLICATIONS

Notice of Reasons for Refusal dated Aug. 3, 2021 for corresponding Japanese Application No. 2017-205086 and English translation.
(Continued)

*Primary Examiner* — Naishadh N Desai
(74) *Attorney, Agent, or Firm* — Pearne & Gordon LLP

(57) ABSTRACT

A rotating device according to the present invention includes a motor including an outer shell, a rotating shaft protruding from the outer shell, a first inner bearing supporting the rotating shaft, and a second inner bearing supporting the rotating shaft, a plurality of gears configured to transmit rotation of the motor to an external device, and a casing. A first outer bearing and a second outer bearing are arranged at the casing, and the first outer bearing and the second outer bearing rotatably support portions of the rotating shaft protruding from end surfaces at both sides of the outer shell in a longitudinal direction of the rotating shaft.

10 Claims, 8 Drawing Sheets

(51) Int. Cl.
*H02K 5/173* (2006.01)
*H02K 5/24* (2006.01)
*H02K 7/116* (2006.01)

(52) U.S. Cl.
CPC ........ *H02K 7/1166* (2013.01); *F16C 2361/61* (2013.01); *F16C 2380/27* (2013.01)

(58) Field of Classification Search
CPC . H02K 5/1732; F16H 1/16; F16H 1/06; F16C 19/02; F16C 33/20; F16C 17/08; F16C 19/527; F16C 17/10; F16C 21/00; F16C 17/24; F16C 2361/61; F16C 2380/27; F16C 2362/52
See application file for complete search history.

(56) References Cited

U.S. PATENT DOCUMENTS

| | | | |
|---|---|---|---|
| 5,696,360 A | 12/1997 | Tiemeyer | |
| 6,182,523 B1* | 2/2001 | Nomerange | ........... H02K 5/161 310/90 |
| 2010/0224019 A1 | 9/2010 | Huck et al. | |
| 2014/0209781 A1 | 7/2014 | Weber et al. | |

FOREIGN PATENT DOCUMENTS

| | | |
|---|---|---|
| JP | 07-167330 A | 7/1995 |
| JP | 2009-131119 A | 6/2009 |
| JP | 2013-005512 A | 1/2013 |
| JP | 2017-147856 A | 8/2017 |
| WO | 2015/181900 A1 | 12/2015 |

OTHER PUBLICATIONS

English translation of the Written Opinion for corresponding International Application No. PCT/JP2018/031079 dated Nov. 27, 2018.
Extended European Search Report dated Jul. 8, 2021 for corresponding European Application No. 18871323.4.
International Search Report for corresponding International Application No. PCT/JP2018/031079 dated Nov. 27, 2018.
Written Opinion for corresponding International Application No. PCT/JP2018/031079 dated Nov. 27, 2018.
Chinese Office Action dated Oct. 20, 2021 for corresponding Chinese Application No. 201880068551.8 and English translation.

* cited by examiner

ROTATING DEVICE

FIELD

The present invention relates to a rotating device.

BACKGROUND

Conventionally, a drive device (rotating device) including a motor and a gear for transmitting rotation of the motor to the outside is known, and the drive device can drive, for example, a valve and a switching door (louver) of a vehicle air-conditioner system (see Patent Literature 1 and Patent Literature 2).

CITATION LIST

Patent Literature

Patent Literature 1: Japanese Patent Application Laid-open No. 07-167330
Patent Literature 2: Japanese Laid-open Patent Publication No. 2013-005512

SUMMARY

Technical Problem

However, inner environment of the recently developed vehicles is becoming quieter, and it is considered that, for example, further quietness is required for components including a motor than ever before.

The present invention has been made in view of the foregoing as an example problem to be solved, and it is an object of the present invention to provide a rotating device capable of reducing, for example, vibrating sound.

Solution to Problem

It is an object of the present invention to at least partially solve the problems in the conventional technology. A rotating device according to the present invention includes a motor including an outer shell, a rotating shaft protruding from the outer shell, a first inner bearing supporting the rotating shaft, and a second inner bearing supporting the rotating shaft, a plurality of gears configured to transmit rotation of the motor to an external device, and a casing. A first outer bearing and a second outer bearing are arranged at the casing, and the first outer bearing and the second outer bearing rotatably support portions of the rotating shaft protruding from end surfaces at both sides of the outer shell in a longitudinal direction of the rotating shaft.

Advantageous Effects of Invention

According to an embodiment of the present invention, a rotating device capable of reducing, for example, vibrating sound can be provided.

DESCRIPTION OF EMBODIMENTS

The following describes modes (hereinafter, called "embodiments") for carrying out the present invention will be described in detail based on the accompanying drawings. The same components are denoted by the same reference signs throughout the description of the embodiments.

Figure 1:
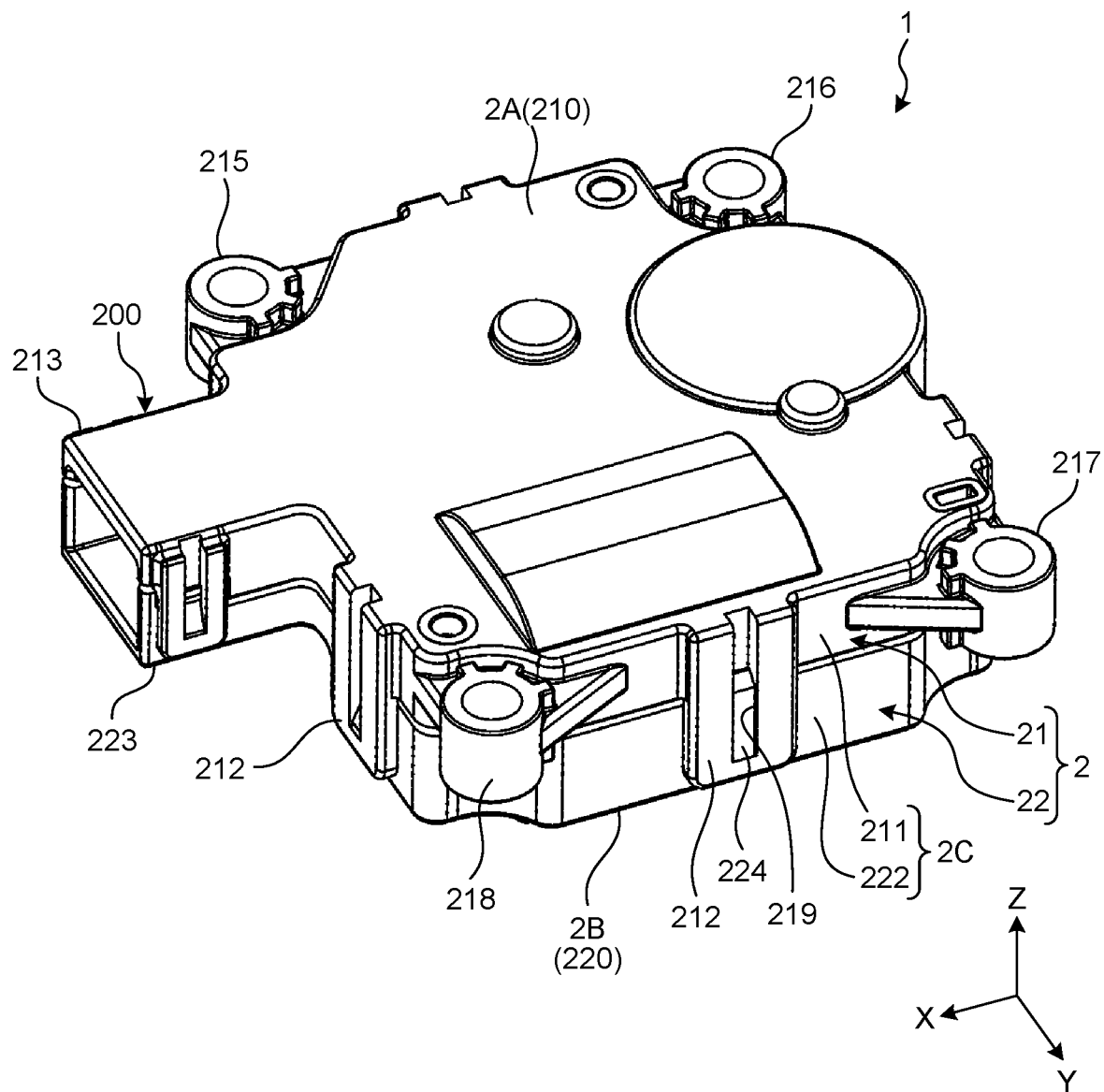
FIG. 1 is a perspective view of a rotating device according to an embodiment.
Figure 2:
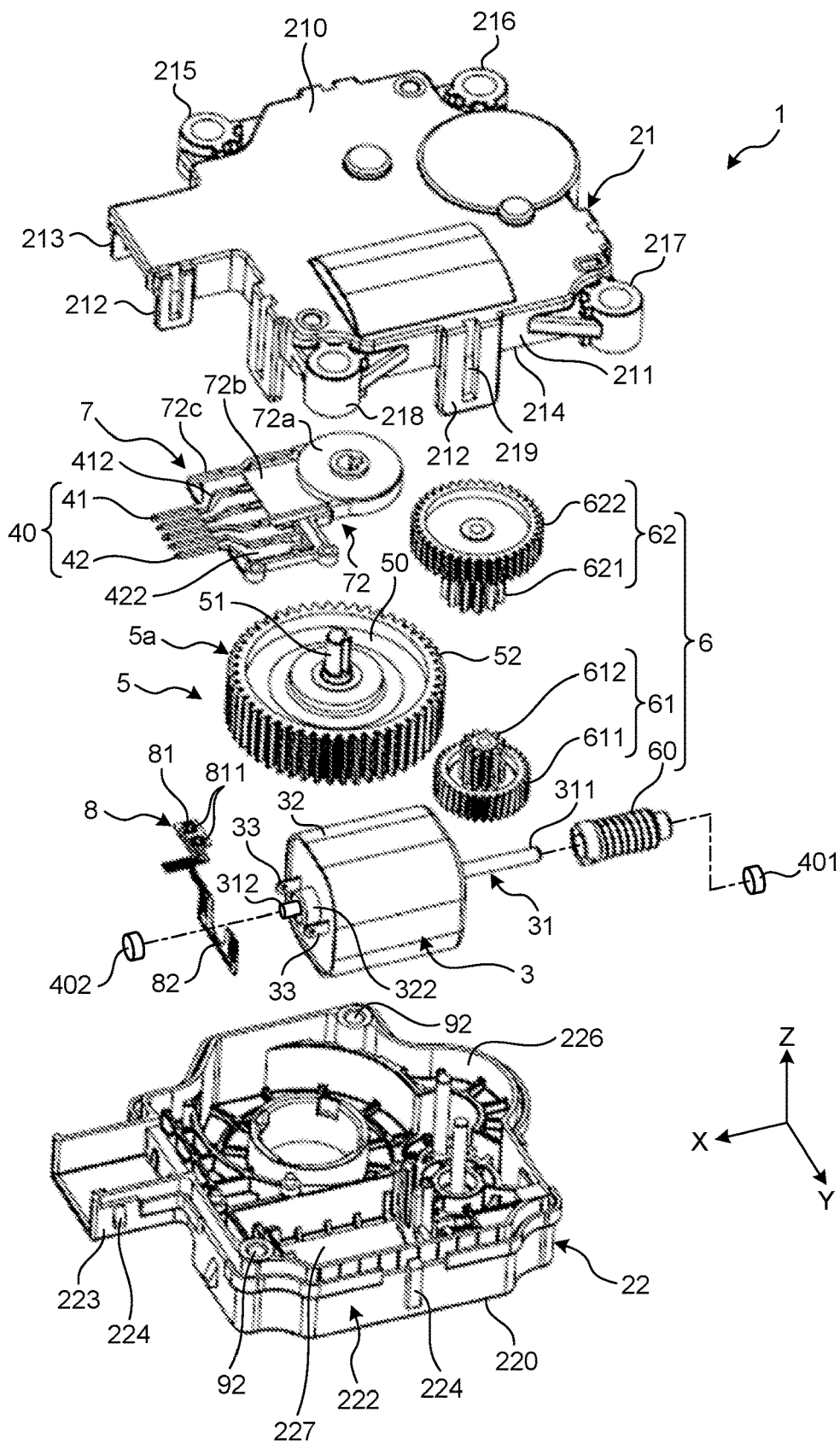
FIG. 2 is an exploded perspective view of the rotating device according to the embodiment.
Figure 3:
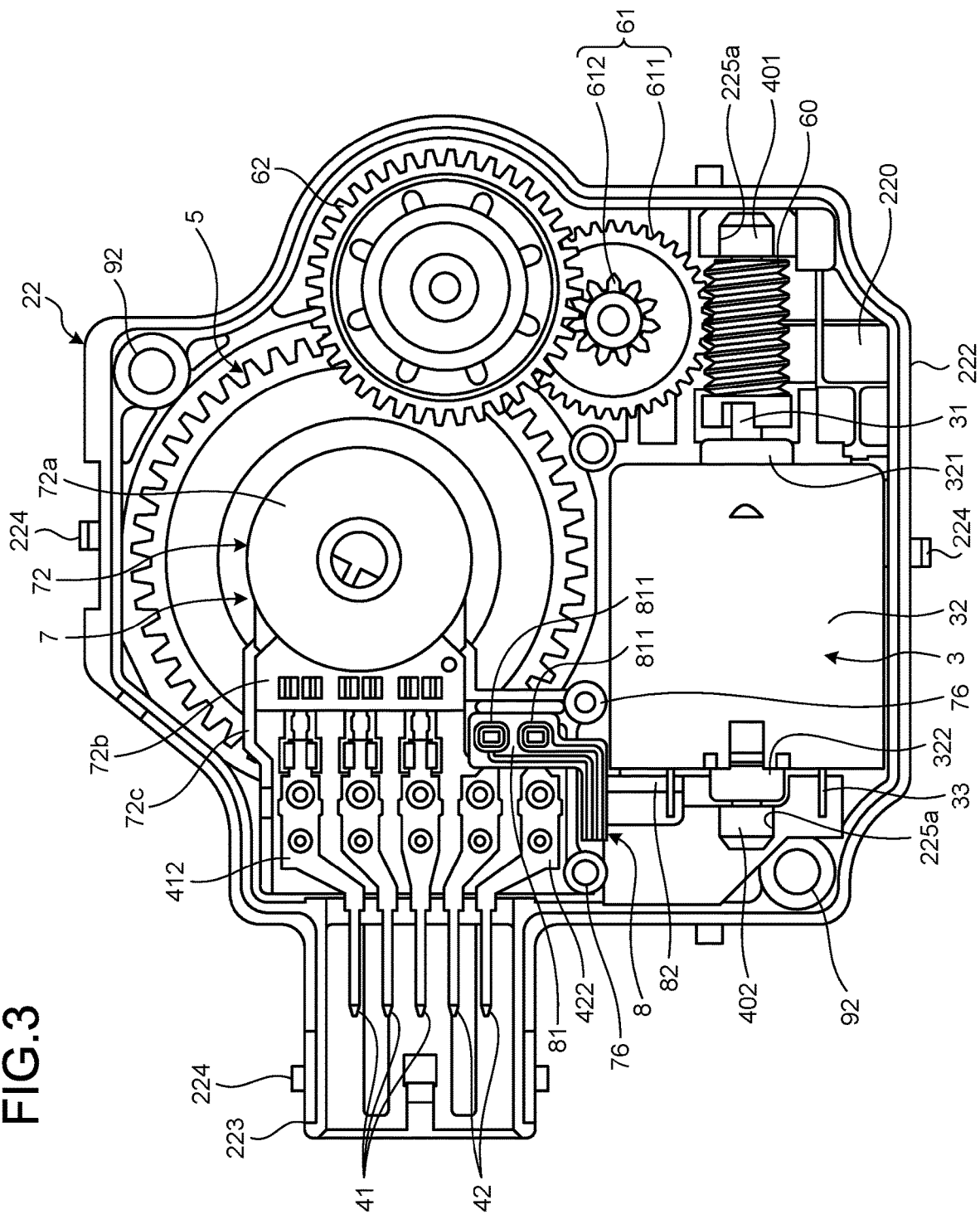
FIG. 3 is a plan view of the rotating device according to the embodiment with a first casing being removed from the rotating device.
Figure 4:
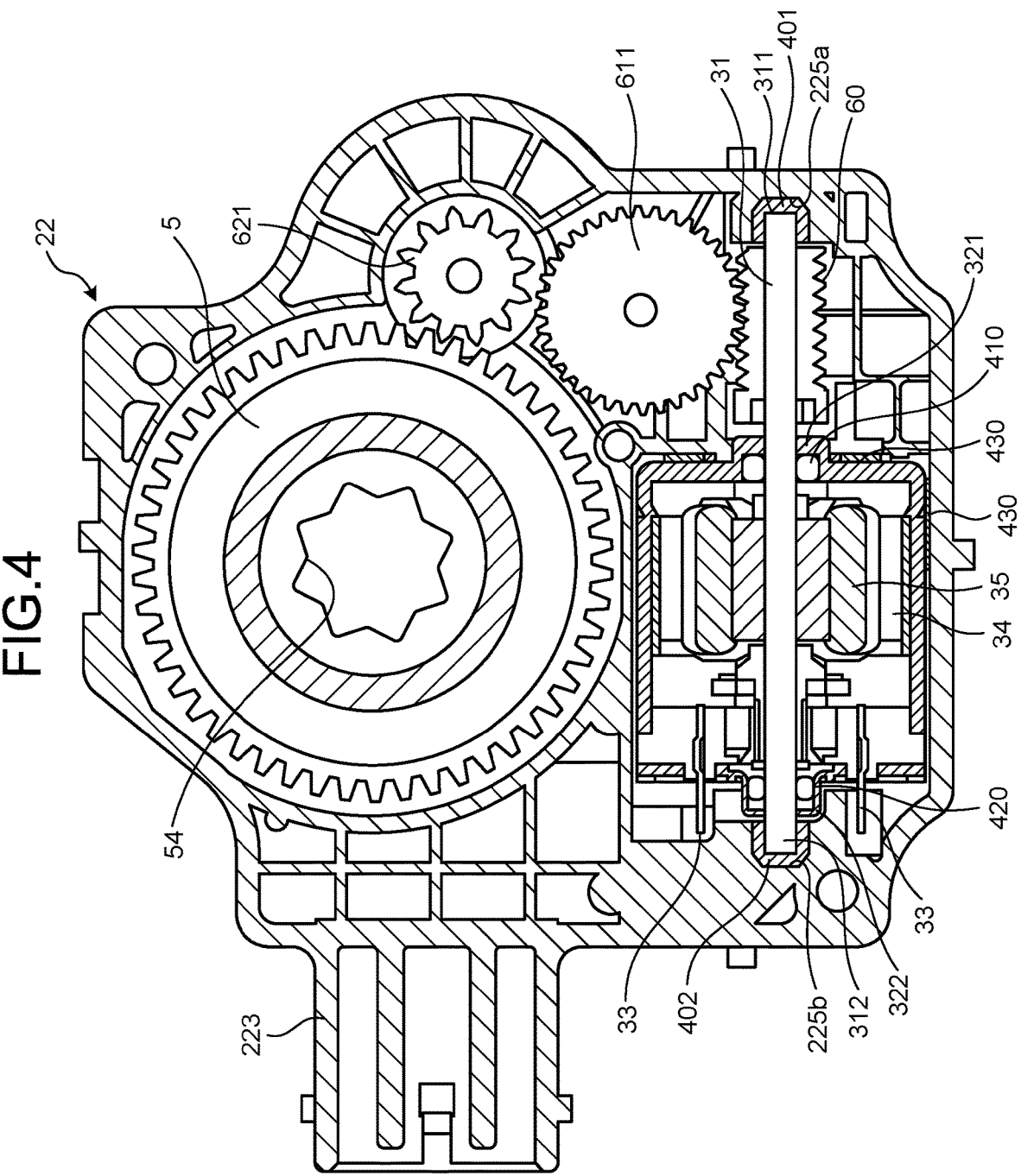
FIG. 4 is a diagram illustrating a horizontal sectional view of the rotating device according to the embodiment.
Figure 9:
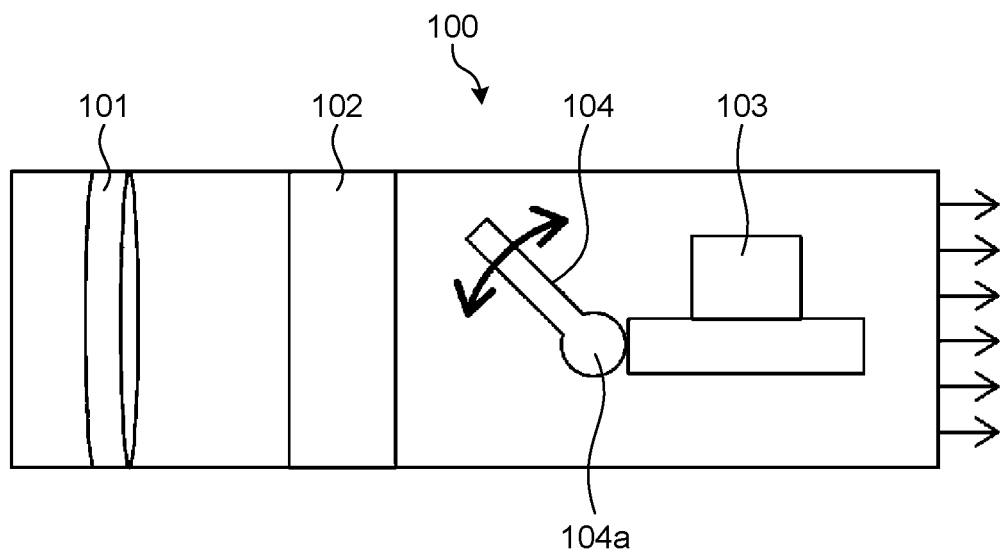
FIG. 9 is a diagram illustrating a general configuration of an air-conditioning system including the rotating device according to the embodiment.

FIG. 1 is a perspective view of a rotating device according to an embodiment, and FIG. 2 is an exploded perspective view of the rotating device according to the embodiment. FIG. 3 is a plan view of the rotating device according to the embodiment with a first casing being removed from the rotating device, and FIG. 4 is a diagram illustrating a horizontal sectional view of the rotating device according to the embodiment. FIG. 9 is a diagram illustrating a general configuration of an air-conditioning system including the rotating device according to the embodiment, and FIG. 10 is a diagram illustrating a vehicle including the air-conditioning system illustrated in FIG. 9.

Figure 10:
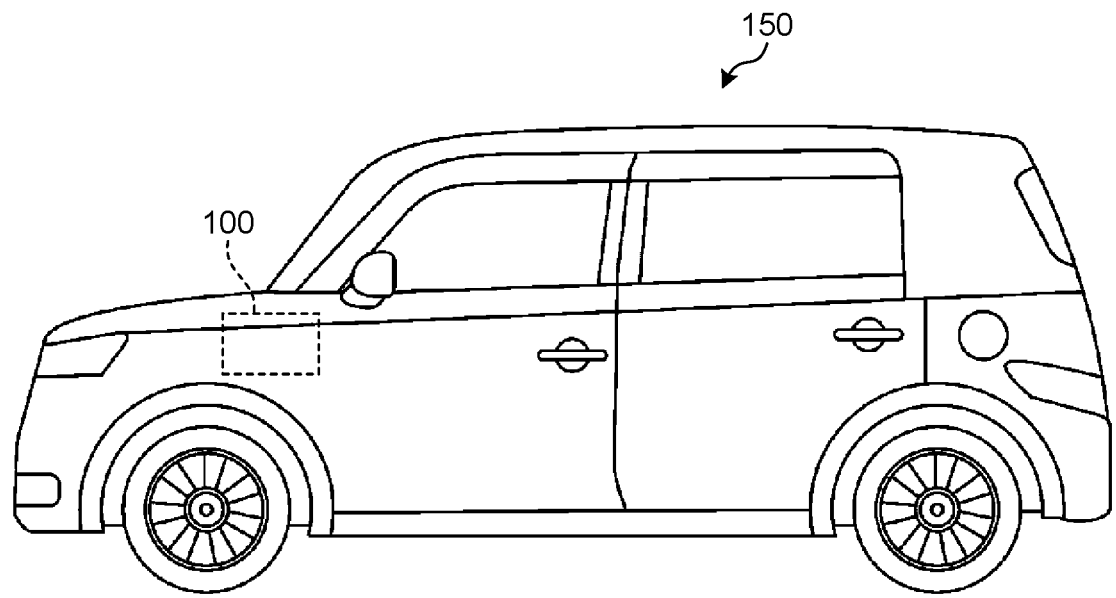
FIG. 10 is a diagram illustrating a vehicle including the air-conditioning system illustrated in FIG. 9.

This rotating device 1 according to the embodiment is included in, for example, an air-conditioning system 100 for a vehicle installed in a vehicle 150 illustrated in FIG. 10. As illustrated in FIG. 9, the air-conditioning system 100 for a vehicle includes a blower fan 101, an evaporator 102 for cooling air delivered from the blower fan 101, and a heater 103 disposed downstream of the evaporator 102. A louver 104 configured to control an amount of air supplied from the evaporator 102 to the heater 103 is disposed between the evaporator 102 and the heater 103 to control an amount of supply of the air flowing from the evaporator 102 side toward the heater 103 side. The rotating device 1 rotates a drive shaft 104a of the louver 104. The rotating device 1 can control the rotational movement of the louver 104 configured to control, for example, the amount of air in the air-conditioning system 100.

As illustrated in FIGS. 1 and 2, the rotating device 1 includes a casing 2 accommodating functional units. Specifically, the functional units include, for example, a motor 3, a plurality of transmission gears 6, an output gear 5, and a sensor 7 and these functional units are described later.

In the description below, for ease of description, a direction in which a first casing 21 and a second casing 22 is joined is referred to as an up-down direction (positive and negative directions of a Z-axis). A longitudinal direction of a rotating shaft 31 of the motor 3 is referred to as a front-back direction (positive and negative directions of an X-axis). And a direction orthogonal to the up-down direction and the front-back direction is referred to as a left-right direction (positive and negative directions of a Y-axis).

(Casing 2)

The casing 2 is configured by joining the first casing 21 including an opening 214 and the second casing 22 including an opening 226 with the openings 214 and 226 facing each other. The casing 2 formed by joining the first casing 21 and the second casing 22 includes a top surface 2A, a bottom 2B, and a side wall 2C. When the positional relation between an upper side and a lower side is described in the description below, the reference state of the rotating device 1 is such that the first casing 21 is relatively at the upper side and the second casing 22 is relatively at the lower side.

The first casing 21 includes a first surface 210 serving as the top surface 2A of the casing 2, a first side wall 211 disposed along the outer circumference of the first surface 210, and the opening 214 defined by the first side wall 211. The second casing 22 includes a second surface 220 serving as the bottom 2B of the casing 2, a second side wall 222 disposed along the outer circumference of the second surface 220, and the opening 226. The first side wall 211 and the second side wall 222 form the side wall 2C of the casing 2. The casing 2 is made of a resin material such as polypropylene, polyethylene terephthalate, or ABS.

The first casing 21 includes a plurality of fitting portions 212 integrally formed with the outer circumference of the first side wall 211, and the fitting portions 212 extend toward the second casing 22 side. The fitting portions 212 are provided with holes (hereinafter referred to as fitting holes 219). The second casing 22 includes a plurality of protrusions (hereinafter referred to as fitting protrusions 224) corresponding to the plurality of fitting portions 212 of the first casing 21 and integrally formed with the second side wall 222. These fitting protrusions 224 are fitted in the fitting holes 219 of the fitting portions 212.

In other words, the first casing 21 and the second casing 22 are joined such that the plurality of the fitting protrusions 224 of the second casing 22 are fitted in the fitting holes 219 of the plurality of fitting portions 212 of the first casing 21, and the first casing 21 and the second casing 22 are integrated to form the casing 2 (FIG. 1) accommodating the functional units including various types of parts.

Although, in the present embodiment, the fitting portions 212 are included in the first casing 21 and the fitting protrusions 224 are included in the second casing 22, the fitting portions 212 may be included in the second casing 22 and the fitting protrusions 224 may be included in the first casing 21.

The first casing 21 includes a plurality of (e.g., two) protrusions (not illustrated) at an inner surface of the first surface 210, and the second casing 22 includes, as illustrated in FIGS. 2 and 3, a plurality of bosses 92 at an inner surface of the second surface 220 and the plurality of bosses 92 include through-holes corresponding to the plurality of protrusions. When the first casing 21 and the second casing 22 abut each other and are joined to form a unitary structure, each of the protrusions is pushed and fitted in each of the through-holes. These protrusions and through-holes extend in the direction of the axis of rotation of the transmission gears 6 or the output gear 5.

These two pairs of protrusions and through-holes provide a reference for joining the first casing 21 and the second casing 22 and allow for accurate positioning in the X and Y directions. Moreover, providing the protrusions fitted in the through-holes can increase the rigidity of the casing 2 and can prevent generation of abnormal noises. This configuration also prevents leaking of sounds generated inside the rotating device 1 through the through-holes.

As illustrated in FIGS. 1 and 2, on the first casing 21 and the second casing 22, a protruding portion 213 and a protruding portion 223 corresponding to each other are formed. In the present embodiment, the protruding portions 213, 223 protrude in an extension direction of the rotating shaft 31 (FIG. 2) of the motor 3 These protruding portions 213 and 223 are joined to form a connector 200 (FIG. 1).

As illustrated in FIG. 3, the connector 200 accommodates a plurality of (three, in this example) first connection terminals 41 electrically connected to connection terminals (not illustrated) of a sensor 7 to be described later, and a plurality of (two, in this example) second connection terminals 42 electrically connected to motor terminals 33 of the motor 3 to be described later.

As illustrated in FIGS. 1 and 2, the first casing 21 includes four mounting parts 215, 216, 217, 218 at the outer circumference for use in mounting the rotating device 1 to a predetermined position n, for example, an air-conditioning system.

The rotating device 1 includes, as illustrated in FIGS. 2 and 3, the motor 3, the output gear 5 that mechanically outputs rotation of the rotating shaft 31 of the motor 3 to an external device, the plurality of transmission gears 6 configured to transmit rotation of the motor 3 to the output gear 5, and the sensor 7 that detects the rotation angle of the output gear 5, as the various types of parts configuring the functional units accommodated in the casing 2. The sensor 7 includes a sensor unit 70 (see FIG. 6) and a case (hereinafter referred to as a sensor housing 72) accommodating the sensor unit 70. The rotating device 1 can control the rotation angle or the rotation rate of the motor 3 based on the rotation angle or the rotation rate of the output gear 5 detected by the sensor unit 70.

The plurality of transmission gears 6 include a multi-step first transmission gear 61 and a multi-step second transmission gear 62. Since the plurality of gears mesh with each other, the rotation of the rotating shaft 31 of the motor 3 is transmitted to an output shaft 51 of the output gear 5.

As illustrated in FIGS. 2 and 3, the rotating device 1 according to the present embodiment includes a flexible circuit board 8, and the circuit board 8 electrically connects the first connection terminals 41 with the motor 3 and the second connection terminals 42 with the sensor 7. Via the circuit board 8 and a connection terminals 40 (the first connection terminals 41 and the second connection terminals 42), input/output signals for driving the motor 3 and a signal corresponding to the rotation angle of the output gear 5 detected by the sensor 7 can be obtained from an external device. In this description, the term electrical connection includes a concept of directly connecting two members and a concept of connecting two members via other connection members. The circuit board is included in the concept of a connection member to be described later.

The following more specifically describes elements configuring the functional units.

(Motor 3)

The motor 3 is a drive device for rotating the output gear 5, and in the present embodiment, a direct-current (DC) motor is used as the motor 3. The motor 3 includes, as illustrated in FIG. 2, an outer shell (frame) 32 including a rectangular prism outer shape with rounded corners and covering a main body of the motor 3, the rotating shaft 31, and a pair of motor terminals 33, 33. The outer shell 32 includes two side surfaces serving as a top surface and a bottom surface, and the two side surfaces are end surfaces at both of the opposite sides in the longitudinal direction of the rotating shaft 31.

A first protrusion 321 is formed at the center of the top surface of the outer shell 32, and a second protrusion 322 is formed at the center of the bottom surface of the outer shell 32, and the rotating shaft 31 protrudes from the first protrusion 321 and the second protrusion 322 toward the side wall 2C of the casing 2 (second casing 22). The pair of motor terminals 33, 33 are disposed at the bottom surface of the outer shell 32 and face each other across the second protrusion 322.

As illustrated in FIG. 4, the rotating shaft 31 is rotatably supported by a plurality of supports included in the rotating device 1 and the details will be described later. The plurality of supports include: a first outer bearing 401 as a first support and a second outer bearing 402 as a second support that support, respectively, portions (both of end portions at opposite sides) 311, 312 of the rotating shaft 31 protruding from the outer shell 32; and a first inner bearing 410 and a second inner bearing 420 that support the rotating shaft 31 from inside the outer shell 32.

The first outer bearing 401 as the first support and the second outer bearing 402 as the second support are disposed at the side wall 2C (the side wall 222 of the second casing 22) of the casing 2. The first outer bearing 401 and the second outer bearing 402 are held by the side wall 2C of the casing 2. Both of the portions of the rotating shaft 31 supported by the first outer bearing 401 as the first support and the second outer bearing 402 as the second support are the opposite end portions 311, 312 of the rotating shaft 31.

Inside the main body of the motor 3, a rotor 34 is fixed to a middle portion of the rotating shaft 31 while being slightly spaced apart from a stator 35. A worm gear 60 is mounted to a portion (end portion) of the rotating shaft 31 protruding from the first protrusion 321 of the outer shell 32, and the worm gear 60 is one of the transmission gears 6 to be described below.

(Transmission Gears 6)

The transmission gears 6 are gears for transmitting rotation of the rotating shaft 31 of the motor 3 to the output gear 5 at a predetermined reduction ratio (gear ratio). In the present embodiment, as described above, the transmission gears 6 include the multi-step first transmission gear 61, the multi-step second transmission gear 62. The transmission gears may include the worm gear 60 mounted to the rotating shaft 31 of the motor 3.

As illustrated in FIG. 2, the transmission gears 6 include the first transmission gear 61 including a first large diameter portion 611 and a first small diameter portion 612 and the second transmission gear 62 including a second small diameter portion 621 and a second large diameter portion 622. The first large diameter portion 611 is formed to include a diameter larger than the diameter of the first small diameter portion 612. The relation between the second large diameter portion 622 and the second small diameter portion 621 is the same as the relation described above.

The first large diameter portion 611 of the first transmission gear 61 meshes with the worm gear 60 mounted to the rotating shaft 31 of the motor 3. The first small diameter portion 612 of the first transmission gear 61 meshes with the second large diameter portion 622 of the second transmission gear 62, and the second small diameter portion 621 of the second transmission gear 62 meshes with the output gear 5. In this way, the meshing of the plurality of gears causes the rotation of the rotating shaft 31 of the motor 3 to be transmitted to the output shaft 51 of the output gear 5 at a predetermined reduction ratio.

In the present embodiment, the two types of multi-step gears, the first transmission gear 61 and the second transmission gear 62, are used to transmit the rotation of the rotating shaft 31 of the motor 3 to the output gear 5 in a small space with an adjusted gear ratio, however, in a possible design, the second transmission gear 62 may be, for example, eliminated so that the output gear 5 meshes with the first small diameter portion 612 including a small diameter of the first transmission gear 61, or both first transmission gear 61 and second transmission gear 62 may be eliminated so that the output gear 5 directly meshes with the worm gear 60.

(Output Gear 5)

As illustrated in FIG. 2, the output gear 5 includes a gear main body 5a including an outer circumferential surface formed with teeth 52 along the outer circumferential surface and a recess 50 recessed in the direction of the axis of rotation (the longitudinal direction of the output shaft 51 serving as the rotating shaft). The gear main body 5a includes a short tubular shape.

As described above, the first transmission gear 61 and the second transmission gear 62 are multi-step gears. The second large diameter portion 622 of the second transmission gear 62 is disposed so as to partially overlap the output gear 5 and the first large diameter portion 611 of the first transmission gear 61 in the direction of the axis of rotation of the output gear 5 (see FIG. 3). Accordingly, the transmission gears 6 can be disposed in a compact space without increasing the size of the casing 2.

A key fittable with a rotation plate 71 (see FIG. 6) included in the sensor 7 is formed at the upper end (one end) of the output shaft 51. The lower half of the output shaft 51 includes a diameter larger than the diameter of the upper half of the output shaft 51, and as illustrated in FIG. 4, a fitting portion 54 fittable with an external shaft such as the drive shaft 104a of the louver 104 of the air-conditioning system 100 described above is formed at the inner circumferential surface of the output shaft 51. Accordingly, the rotation of the output gear 5 can control the rotational movement of the louver 104 and can adjust, for example, an amount of air of the air-conditioning system 100 (see FIG. 9).

As described above, the drive shaft 104a of the louver 104 of the air-conditioning system 100 installed in, for example, a vehicle is connected to the output gear 5. In other words, the output gear 5 is a gear that outputs the rotational force of the rotating shaft 31 of the motor 3 as driving force for controlling the drive shaft 104a of the louver 104. However, the output gear 5 is not necessarily directly connected to a target shaft of rotation such as the drive shaft 104a of the louver 104. For example, another gear member may be interposed between the rotating device 1 and a target shaft of rotation, and in this case, the rotating shaft of the interposed gear may be connected to the output gear 5.

(Sensor 7)

Figure 6:
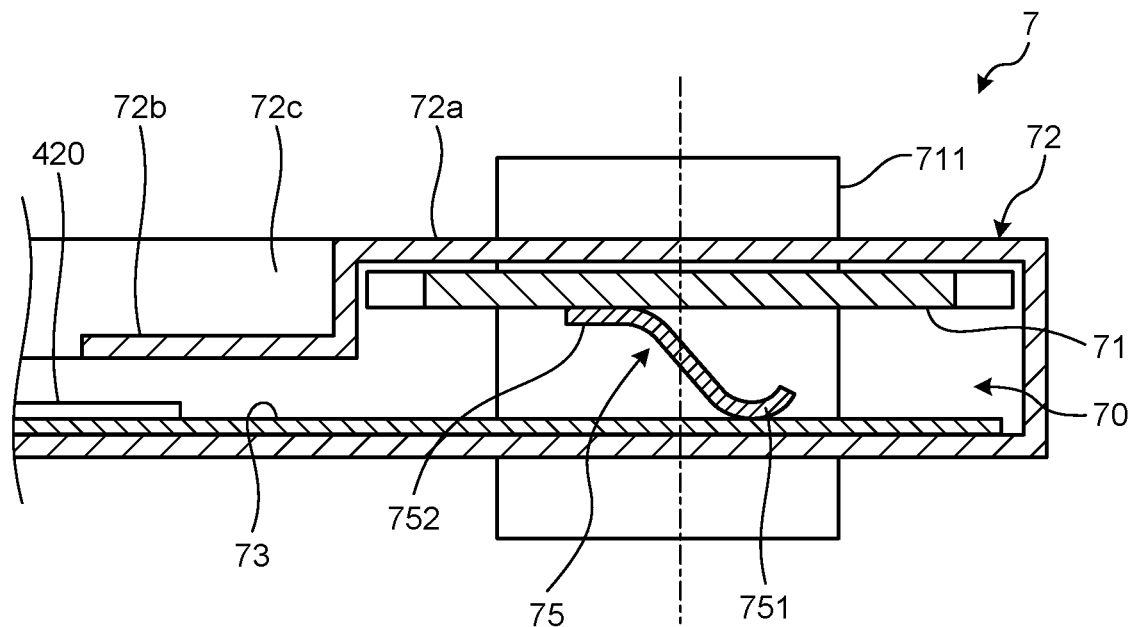
FIG. 6 is a diagram illustrating a sectional view of a sensor.

As described above, to drive the louver 104 included in, for example, the air-conditioning system 100 (see FIG. 9) to a predetermined state, the rotation angle of the output gear 5 can be detected by the sensor 7. The sensor 7 is described with reference to FIGS. 2, 3, and 6. FIG. 6 is a diagram illustrating a sectional view of the sensor 7.

As illustrated in FIGS. 2, 3, and 6, the sensor 7 includes a sensor table 72c and the sensor unit 70 (see FIG. 6) mounted on the sensor table 72c.

The sensor unit 70 includes a sensor board 73 disposed on the sensor table 72c, the first connection terminals 41 connected to a conductor portion (not illustrated) formed on the sensor board 73, the rotating plate 71 rotatable with the output gear 5, and a conductor brush 75 including bifurcated distal end 751 as a first end and base end 752 as a second end, the base end 752 being fixed to the rotating plate 71 so that the distal end 751 is in contact with the conductor portion on the sensor board 73.

The sensor unit 70 is accommodated in a case (hereinafter referred to as the sensor housing 72). The the sensor housing 72 includes a circular shape when seen in the plan view, and includes a housing main body 72a accommodating the rotating plate 71 and a cover 72b including a rectangular shape when seen in the plan view and extending from the housing main body 72a toward the connection terminals 40. As illustrated in FIG. 6, the rotating plate 71 includes a boss 711 disposed at the center of the rotating plate 71, and the housing main body 72a and the sensor table 72c each include a hole, and the boss 711 is inserted in the respective holes.

The rotating device 1 can control the rotation of the motor 3 based on the rotation angle of the output gear 5 detected by the sensor 7 configured as described above.

As illustrated in FIGS. 2 and 3, the sensor table 72c includes a substantial L-shape when seen in the plan view, and at a front portion of the sensor table 72c, three first connection terminals 41 are disposed close to the sensor board 73 and two second connection terminals 42 are disposed close to the motor 3. The three first connection terminals 41 and the two second connection terminals 42 are disposed sequentially. The sensor table 72c includes two holes 76, 76 disposed at a side of the front portion (a side portion close to the connector 200 in the illustrated example), and the sensor table 72c is fastened to the second casing 22 by screws or vis screws inserted in the holes 76, 76.

The five connection terminals 40 include conductor portions 412, 422 respectively. The three first connection terminals 41 are connected to the sensor board 73 via the conductor portions 412. The two second connection terminals 42 are connected to the circuit board 8 via the conductor portions 422, and are connected to the motor 3 via the circuit board 8.

(Circuit Board 8)

Figure 7:
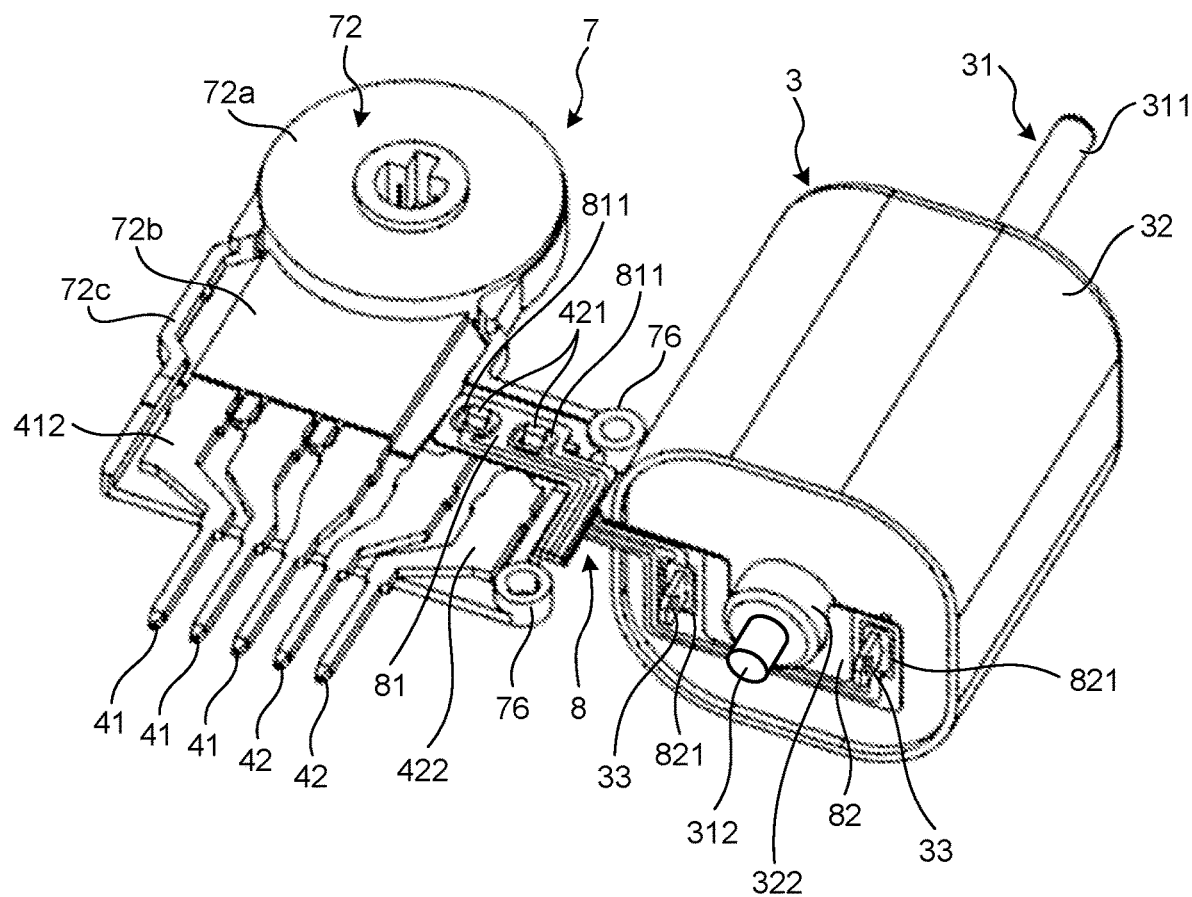
FIG. 7 is a diagram illustrating a circuit board connecting second connection terminals with the motor.

The two second connection terminals 42 disposed at the sensor table 72c are connected to the motor 3 via the circuit board 8. FIG. 7 is a diagram illustrating the circuit board 8 connecting the second connection terminals 42 with the motor 3.

The circuit board 8 is made of a flexible film, and includes, as illustrated in FIGS. 2, 3, and 7, two large planar portions 81, 82. Specifically, the circuit board 8 includes a first planar portion 81 connected to the second connection terminals 42 and a second planar portion 82 connected to the motor terminals 33.

The structure of the flexible circuit board 8 includes a film (resin board) including a thickness of, for example, about 12 μm to 50 μm, adhesive layer deposited on the film, and a conductor including a thickness of, for example, about 12 μm to 50 μm printed or bonded on the adhesive layer. The film is made of an insulating resin material such as polyimide and polyester. The conductor is made of a metal material such as copper. The adhesive layer is made of epoxy resin or acrylic resin. The circuit board 8 is a flexible board restorable to the initial state after being bent at an angle equal to or larger than 90 degrees.

As many holes 811 as the number of the second connection terminals 42 are provided on the first planar portion 81 of the flexible circuit board 8. The holes 811 are two and fitted with bent portions 421 formed at one end of each of the conductor portions 422 conductively connected to the second connection terminals 42. Fitting the bent portions 421 of the conductor portions 422 conductively connected to the second connection terminals 42 in the holes 811, 811 and, connecting by, for example, soldering can make more secure electrical connection and can prevent electrical contact failure.

As illustrated in FIG. 7, the second planar portion 82 includes a pair of holes 821, 821 fittable with the pair of motor terminals 33, 33. Fitting the motor terminals 33, 33 in the holes 821, 821 and connecting by soldering can make more secure electrical connection.

As described above, the second connection terminals 42 are connected to the motor 3 via the flexible circuit board 8, and when, for example, vibration of a vehicle such as an automobile vibrates the second connection terminals 42, the flexible circuit board 8 changes the shape (or absorbs the vibration) before a large stress is applied to the electrically connected portions such as soldered joints, and the amplitude of the vibration is reduced. Accordingly, application of a large stress to the connected portions can be prevented so that cracks or damages on the connected portions can be prevented.

The flexible circuit board 8 is used to electrically connect the second connection terminals 42 with the motor 3, and using the flexible circuit board 8 is easier to handle and is more advantageous in terms of manufacturing costs than using, for example, thin, fragile leads.

(Support Structure for Rotating Shaft 31 of Motor 3)

Figure 5:
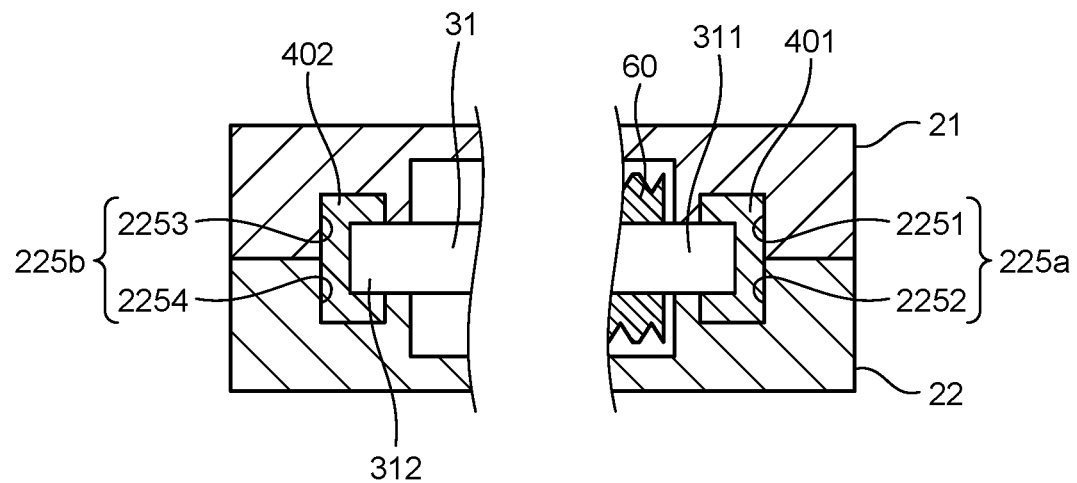
FIG. 5 is a sectional view illustrating a partially omitted support structure for a rotating shaft of a motor.

The following specifically describes a support structure for the rotating shaft 31 of the motor 3 included in the rotating device 1 according to the present embodiment with reference to FIGS. 2 to 5. FIG. 5 is a sectional view illustrating a partially omitted support structure for the rotating shaft 31 of the motor 3.

Suppose that, for example, a rotating shaft, such as a rotating shaft of a typical DC motor, protruding from a main body with an end being a free end is provided with a worm gear and the worm gear meshes with a transmission gear. In this structure, the rotating shaft is supported at one end and the rotating shaft is subjected to side pressure due to the reaction force from the gear meshing with the worm gear. This structure may generate unexpected vibrations, and accordingly, may impair quietness and generate an abnormal noise.

As described above, the rotating shaft 31 of the motor 3 according to the present embodiment is rotatably supported by a plurality of supports included in the rotating device 1. The plurality of supports according to the present embodiment are the first outer bearing 401 as the first support, the second outer bearing 402 as the second support, and the first inner bearing 410 and the second inner bearing 420.

The first outer bearing 401 and the second outer bearing 402 are made of a resin material and include a cap shape (including a tubular outer circumferential surface with an end in the longitudinal direction of the rotating shaft being a bottom and the other end being an opening). The first outer bearing 401 and the second outer bearing 402 are provided to surround and support the end portions 311, 312 of the rotating shaft 31 protruding from the outer shell 32 of the motor 3. In other words, the first outer bearing 401 and the second outer bearing 402 can receive force applied to both of the end portions 311, 312 of the rotating shaft 31 of the motor 3 both in the axial direction and in the direction (radial direction) orthogonal to the axial direction.

In particular, the worm gear 60 is mounted to the rotating shaft 31 of the motor 3 in the rotating device 1, between the one end portion 311 protruding from the outer shell 32 and the first protrusion 321 disposed at the center of the top surface of the outer shell 32. The worm gear 60 meshes with the first large diameter portion 611 of the first transmission gear 61.

In this structure, both of the end portions 311, 312 of the rotating shaft 31 of the motor 3 are supported by the first outer bearing 401 and the second outer bearing 402, respectively. Accordingly, the rotating shaft 31 can be configured as a double supported shaft, and this configuration can significantly reduce the vibration of the rotating shaft 31 and also reduce the vibration of the casing 2 caused by the vibration of the rotating shaft 31.

To hold the cap-shaped first outer bearing 401 and second outer bearing 402, the rotating device 1 according to the present embodiment includes a first fitting portion 225a and a second fitting portion 225b formed on the casing 2 as illustrated in FIGS. 3 to 5.

The first fitting portion 225a and the second fitting portion 225b include the same shape, and the first fitting portion 225a is formed by recesses (hereinafter referred to as fitting recesses 2251, 2252) abutting each other and formed, respectively, in the first casing 21 and the second casing 22 facing each other to configure the casing 2. The second fitting portion 225b is formed by fitting recesses 2253, 2254 abutting each other and formed, respectively, in the first casing 21 and the second casing 22.

In other words, as illustrated in FIG. 5, the first casing 21 includes a pair of fitting recesses 2251, 2253 corresponding to the first outer bearing 401 and the second outer bearing 402, respectively, and the second casing 22 includes a pair of fitting recesses 2252, 2254 corresponding to the first outer bearing 401 and the second outer bearing 402, respectively. The fitting recesses 2251, 2252 abut each other to form the first fitting portion 225a and the fitting recesses 2253, 2254 abut each other to form the second fitting portion 225b.

Since the pair of fitting recesses 2251, 2253 are formed in the first casing 21 and the pair of fitting recesses 2252, 2254 are formed in the second casing 22, the structure for holding the first outer bearing 401 and the second outer bearing 402 can be easily provided by joining the first casing 21 and the second casing 22. Accordingly, the rotating device 1 can be assembled more easily in the manufacturing process.

The first inner bearing 410 and the second inner bearing 420 are provided to support the rotating shaft 31 in the outer shell 32, and are plain bearing made of a metal material (sintered material) what is called "metal".

Specifically, the first inner bearing 410 is disposed in the first protrusion 321 formed at the center of the top surface of the outer shell 32 and the second inner bearing 420 is disposed in the second protrusion 322 formed at the center of the bottom surface of the outer shell 32.

In this regard, bearing holders corresponding to the first inner bearing 410 and the second inner bearing 420 are formed in the outer shell 32, and the rotating shaft 31 can be supported more securely.

The configuration of the rotating device 1 according to the present embodiment can reduce the vibration of the rotating shaft 31 and thus can reduce the vibrating sound of the rotating device 1. In this regard, the rotating device 1 can be suitably included in, for example, the air-conditioning system 100 for a vehicle (see FIG. 9) requiring quietness.

The worm gear 60 mounted to the rotating shaft 31 is disposed between the first protrusion 321 and the first outer bearing 401 and this disposition facilitates accurate positioning. Accordingly, improved positioning accuracy can reduce noises from the worm gear 60 and the first transmission gear 61 meshing with the worm gear 60. The improved positioning accuracy can prevent jumping of the worm gear 60.

Furthermore, the configuration above can reduce vibration caused by frictions between the first inner bearing 410 and the second inner bearing 420 and the rotating shaft 31 of the motor 3 when side pressure is applied, and can reduce noise emitted from the rotating device 1 generated by the vibration.

Since the rotating shaft 31 of the motor 3 is configured as a double supported shaft, the load on the first inner bearing 410 and the second inner bearing 420 is reduced, and thus, failures attributed to the first inner bearing 410 and the second inner bearing 420 can be prevented and an increase in the durability of the motor 3 can be expected.

(Holding Structure for Motor 3)

As described above, the main body of the motor 3 included in the rotating device 1 according to the present embodiment is covered by the outer shell 32 including a rectangular prism outer shape with rounded corners. In the present embodiment, as illustrated in FIG. 4, the motor 3 is accommodated in the casing 2 such that the outer shell 32 is held by the casing 2 via an elastic member 430 including viscosity.

In other words, as illustrated in FIG. 2, the second casing 22 configuring a half part of the casing 2 includes a motor accommodating portion 227 for accommodating a major part of the motor 3. The motor 3 is disposed in the motor accommodating portion 227 such that a plurality of the elastic members 430 appropriately spaced apart from each other are interposed between a wall surface defining the motor accommodating portion 227 and the outer shell 32 of the motor 3.

Since the outer shell 32 of the motor 3 is severely vibrated by electromagnetic force, the outer shell 32 is configured not to directly contact the casing 2. Accordingly, this configuration prevents transmission of vibration (noise) of the motor 3 and improves the quietness of the rotating device 1.

The elastic members 430 can be made of, for example, a UV curable gel or a two-part composition curable gel. Alternatively, the elastic members 430 may be made of the UV curable gel and the two-part composition curable gel, as appropriate.

The structure for holding the motor 3 in the casing 2 via the elastic members 430 as cushion members is implemented by a few drops of either the UV curable gel or the two-part composition curable gel in the gap between the outer shell 32 of the motor 3 and the wall surface of the casing 2.

[Modification]

As illustrated in FIGS. 2, 3, 6, and 7, the sensor 7 included in the rotating device 1 described above is configured such that the sensor board 73 and the conductor brush 75 configuring the sensor unit 70 are accommodated in the sensor housing 72.

Figure 8:
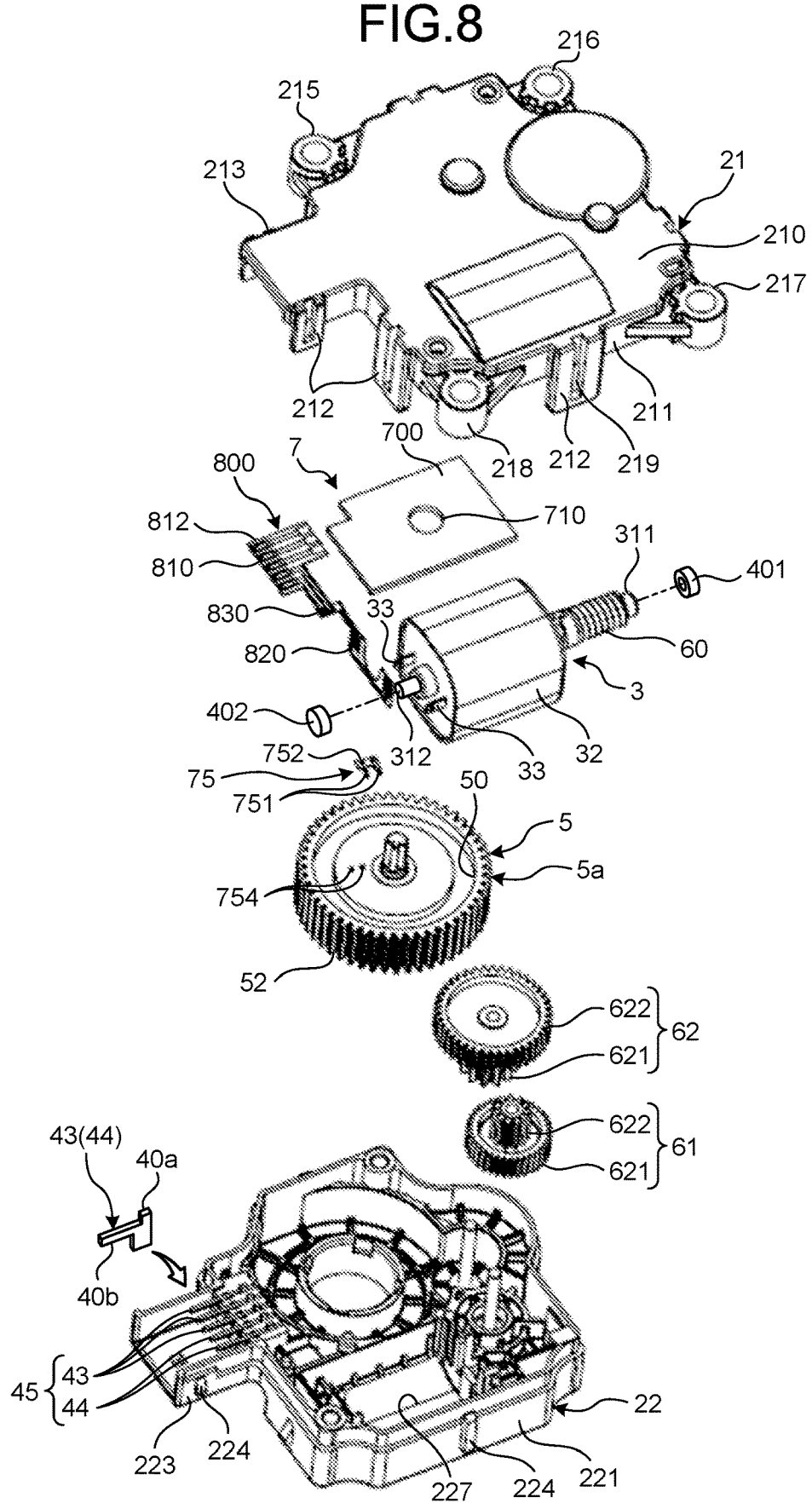
FIG. 8 is an exploded perspective view of a rotating device according to a modification.

However, the sensor 7 may exclude the sensor housing 72. FIG. 8 is an exploded perspective view of a rotating device 1 according to a modification. The rotating device 1 according to the modification differs from the embodiment as described above in that the rotating device 1 according to the modification includes a sensor board 700, connection terminals 45, and a circuit board 800, and the other configurations are given the same reference signs as those used in the embodiment above and the description of the other configurations are omitted.

As illustrated in FIG. 8, the sensor 7 of the rotating device 1 according to the modification includes the sensor board 700 including a rectangular shape and disposed above the output gear 5. The sensor board 700 includes a hole 710 and the output shaft 51 of the output gear 5 is inserted into the hole 710.

The conductor brush 75 is disposed in the recess 50 formed in the output gear 5 in the direction of the axis of rotation. In other words, a pair of brush mounting parts 754 are formed at the bottom surface of the recess 50 of the output gear 5, and the base end 752 of the conductor brush 75 is attached to the brush mounting parts 754, and the distal end 751 is in contact with a conductor portion formed on a back surface of the sensor board 700, that is, a surface facing the output gear 5.

The rotating device 1 according to the modification includes the connection terminals 45 electrically connecting the motor 3 and the sensor 7 to the outside, and the connection terminals 45 include uniformly shaped three sensor connection terminals 43 and two motor connection terminals 44.

As illustrated in FIG. 8, the connection terminals 45 (sensor connection terminals 43, motor connection terminals 44) each include a terminal portion 40b extending in the same direction as the direction of the connector 200 protruding from the casing 2 and include a connection tip 40a opposite to the terminal portion 40b and protruding upward.

The circuit board 800 includes a first planar portion 810 connected to the sensor connection terminals 43, a second planar portion 820 connected to the motor terminals 33, and a middle planar portion 830 connecting the first planar portion 810 with the second planar portion 820. The circuit board 800 according to the modification is made of a flexible material same as the material of the circuit board 8 described in the embodiment above.

The connection tips 40a of the connection terminals 45 are inserted in holes 812 formed in the first planar portion 810 of the circuit board 800. Accordingly, the three sensor connection terminals 43 are electrically connected to the sensor board 700 and the two motor connection terminals 44 are electrically connected to the motor 3.

The rotating device 1 according to the modification above includes a structure for supporting the rotating shaft 31 of the motor 3 by the first outer bearing 401 and the second outer bearing 402, and by the first inner bearing 410 and the second inner bearing 420, and thus the rotating shaft 31 is configured as a double supported shaft. Accordingly, the vibration of the rotating shaft 31 is reduced and, for example, vibrating sound of the rotating device 1 can be reduced.

[Another Embodiment]

In the embodiment above, the rotating shaft 31 of the motor 3 is supported by supports including the first outer bearing 401 and the second outer bearing 402, and the first inner bearing 410 and the second inner bearing 420.

However, the structure of the first outer bearing 401 and the second outer bearing 402 is not necessarily cap-shaped members made of a resin material. The end portions 311, 312 at both of the opposite ends of the rotating shaft 31 protruding from the outer shell 32 may be directly supported by the casing 2.

In other words, the first fitting portion 225a and the second fitting portion 225b illustrated in FIG. 5 may include a shape corresponding, respectively, to the end portions 311, 312 at both of the opposite ends of the rotating shaft 31, not including a shape corresponding, respectively, to the cap-shaped first outer bearing 401 and second outer bearing 402.

In other words, in this embodiment, the first support and the second support surrounding and supporting both of the end portions 311, 312 of the rotating shaft 31 are formed in the casing 2.

In this structure, the rotating shaft 31 is configured as a double supported shaft, and thus, vibration of the rotating shaft 31 is reduced. Accordingly, for example, the vibrating sound of the rotating device 1 can be reduced. In this case, there is no need for, for example, bearings such as metal bearings, and the number of parts can be reduced and accordingly, the weight and manufacturing costs can be reduced.

According to the embodiments above, a rotating device 1 to be described below can be implemented.

(1) The rotating device 1 including the motor 3 including the outer shell 32, the rotating shaft 31 protruding from the outer shell 32, the first inner bearing 410 supporting the rotating shaft 31, and the second inner bearing 420 supporting the rotating shaft 31, the transmission gears 6 and the output gear 5 configured to transmit rotation of the motor 3 to an external device, and the casing 2, wherein a first outer bearing 401 and a second outer bearing 402 are arranged at the casing 2, and the first outer bearing 401 and the second outer bearing 402 rotatably support portions of the rotating shaft 31 protruding from end surfaces at both sides of the outer shell 32 in a longitudinal direction of the rotating shaft 31.

This configuration of the rotating device 1 can reduce the vibration of the rotating shaft 31 and thus can reduce, for example, the vibrating sound of the rotating device 1. The rotating device 1 can be suitably included in, for example, an air-conditioning system 100 for a vehicle requiring quietness.

(2) The rotating device 1 according to (1), wherein the portions of the rotating shaft 31 supported by the first outer bearing 401 and the second outer bearing 402 are the end portions 311, 312 at both ends of the rotating shaft 31.

This configuration of the rotating device 1 can reduce the vibration of the rotating shaft 31 more effectively and can reduce, for example, vibrating sound.

(3) The rotating device 1 according to (1) or (2), wherein the first outer bearing 401 and the second outer bearing 402 are held by the side wall 2C of the casing 2.

This configuration of the rotating device 1 can securely support the rotating shaft 31 of the motor 3 at both of the opposite ends if, for example, the casing 2 is made of, for example, a resin containing glass fibers.

(4) The rotating device 1 according to any one of (1) to (3), wherein the first inner bearing 410 and the second inner bearing 420 are made of a metal material (sintered material), and the first outer bearing 401 and the second outer bearing 402 are made of a resin material.

This configuration of the rotating device 1 need not include a special bearing structure and the manufacturing costs can be reduced.

(5) The rotating device 1 according to (3) or (4), wherein the casing 2 includes the first casing 21 including the plurality of recesses (fitting recesses 2251, 2253) and the second casing 22 including the plurality of recesses (fitting recesses 2252, 2254), the first casing 21 and the second casing 22 opposing each other, and the two pairs of recesses (the fitting recess 2251 and the fitting recess 2252, and the fitting recess 2253 and the fitting recess 2254) opposing each other hold the first outer bearing 401 and the second outer bearing 402.

This configuration of the rotating device 1 can easily hold the first outer bearing 401 and the second outer bearing 402 by joining the first casing 21 and the second casing 22, and facilitates the assembling process of the rotating device 1.

(6) The rotating device 1 according to any one of (1) to (5), wherein the outer shell 32 includes the first protrusion 321 at a top surface being one of the end surfaces on both sides of the outer shell 32 in the longitudinal direction of the rotating shaft 31, and includes the second protrusion 322 at a bottom surface being the other end surface of the outer shell 32, and the first inner bearing 410 is arranged at the first protrusion 321 and the second inner bearing 420 is arranged at the second protrusion 322.

This configuration of the rotating device 1 can use the first protrusion 321 and the second protrusion 322 formed on the outer shell 32 as bearing holders corresponding to the first inner bearing 410 and the second inner bearing 420, and the rotating shaft 31 can be supported more securely.

(7) The rotating device 1 according to any one of (1) to (6) further including the worm gear 60 mounted to a portion of the rotating shaft 31 protruding from one of the end surfaces of the outer shell 32, wherein the worm gear 60 is arranged between the first inner bearing 410 and the first outer bearing 401.

This configuration of the rotating device 1 disposes the worm gear 60 between the first protrusion 321 and the first outer bearing 401, and thus facilitates accurate positioning. Accordingly, improved positioning accuracy can reduce noises from the worm gear 60 and the first transmission gear 61 meshing with the worm gear 60. In addition, the improved positioning accuracy can prevent jumping of the worm gear 60.

(8) The rotating device 1 according to any one of (1) to (7), wherein the outer shell 32 is held by the casing 2 via the elastic member 430 including viscosity.

This configuration of the rotating device 1 prevents the outer shell 32 of the motor 3 subjected to severe vibration caused by the electromagnetic force from directly contacting the casing 2, and thus prevents transmission of vibration (noises) from the motor 3 and improves quietness of the rotating device 1.

(9) The rotating device 1 according to (8), wherein the elastic member 430 is made of one of or both a UV curable gel and a two-part composition gel.

This configuration of the rotating device 1 eliminates the need for an elastic member 430 made of a special material, and thus can improve quietness of the rotating device 1 without increasing manufacturing costs.

While the present invention has been described above based on the embodiments, the present invention is not limited to the embodiments, and can naturally be variously changed within the scope not deviating from the gist of the present invention. Such various changes within the scope not deviating from the gist are also included in the technical scope of the present invention, and apparent to those skilled in the art from the description of the claims.

REFERENCE SIGNS LIST

1 Rotating device
150 Vehicle
100 Air-conditioning system
101 Blower fan
102 Evaporator
103 Heater
104 Louver
104*a* Drive shaft
2 Casing
3 Motor
6 Transmission gear
5 Output gear
7 Sensor
21 First casing
22 Second casing
214 Opening
226 Opening
210 First surface
211 First side wall
220 Second surface
222 Second side wall
219 Fitting hole
224 Fitting protrusion
92 Boss
213, 223 Protruding portion
200 Connector
41 First connection terminal
33 Motor terminal
42 Second connection terminal
215, 216, 217, 218 Mounting part
70 Sensor unit
72 Sensor housing
61 First transmission gear
62 Second transmission gear
51 Output shaft
8 Circuit board
40 Connection terminal
32 Outer shell
31 Rotating shaft
321 First protrusion
322 Second protrusion
311, 312 End portion
401 First outer bearing
402 Second outer bearing
410 First inner bearing
420 Second inner bearing
35 Stator
34 Rotor
60 Worm gear
611 First large diameter portion
612 First small diameter portion
621 Second small diameter portion
622 Second large diameter portion
50 Recess
5*a* Gear main body
72*c* Sensor table
73 Sensor board
71 Rotating plate
751 Distal end
752 Base end
75 Conductor brush
72*a* Housing main body
72*b* Cover
711 Boss
412, 422 Conductor portion
81 First planar portion
82 Second planar portion
421 Bent portion
811, 821 Hole
225*a* First fitting portion
225*b* Second fitting portion
2251, 2252, 2253, 2254 Fitting recess
227 Motor accommodating portion
430 Elastic member
700 Sensor board
45 Connection terminal
800 Circuit board 710 Hole
754 Brush mounting part
43 Sensor connection terminal
44 Motor connection terminal
40*b* Terminal portion
40*a* Connection tip
810 First planar portion
820 Second planar portion
830 Middle planar portion
812 Hole

The invention claimed is:

1. A rotating device comprising:
a motor including an outer shell;
a rotating shaft protruding from the outer shell;
a first inner bearing supporting the rotating shaft;
a second inner bearing supporting the rotating shaft;
a plurality of gears configured to transmit rotation of the motor to an external device; and
a casing, wherein
a first outer bearing and a second outer bearing are arranged at the casing, and the first outer bearing and the second outer bearing rotatably support portions of the rotating shaft protruding from end surfaces at both sides of the outer shell in a longitudinal direction of the rotating shaft.

2. The rotating device according to claim 1, wherein the portions of the rotating shaft supported by the first outer bearing and the second outer bearing are both end portions of the rotating shaft.

3. The rotating device according to claim 1, wherein the first outer bearing and the second outer bearing are held by a side wall of the casing.

4. The rotating device according to claim 1, wherein
the first inner bearing and the second inner bearing are made of a metal material, and
the first outer bearing and the second outer bearing are made of a resin material.

5. The rotating device according to claim 3, wherein
the casing includes a first casing including a plurality of recesses and a second casing including a plurality of recesses,
the first casing and the second casing opposing each other, and
the plurality of recesses opposing each other hold the first outer bearing and the second outer bearing.

6. The rotating device according to claim 1, wherein
the outer shell includes protrusions at the end surfaces on the both sides in the longitudinal direction of the rotating shaft,
the first inner bearing is arranged at one of the protrusions, and
the second inner bearing is arranged at another one of the protrusions.

7. The rotating device according to claim 1, wherein
the plurality of gears include a worm gear mounted to the portion of the rotating shaft protruding from one of the end surfaces of the outer shell, and
the worm gear is arranged between the first inner bearing and the first outer bearing.

8. The rotating device according to claim 1, wherein the outer shell is held by the casing via an elastic member including viscosity.

9. The rotating device according to claim 8, wherein the elastic member is made of one of or both a UV curable gel and a two-part composition gel.

10. The rotating device according to claim 4, wherein
the casing includes a first casing including a plurality of recesses and a second casing including a plurality of recesses,
the first casing and the second casing opposing each other, and
the plurality of recesses opposing each other hold the first outer bearing and the second outer bearing.

\* \* \* \* \*